March 21, 1961 D. C. CLAPSADDLE 2,975,914
FIBROUS MATERIAL DISPENSER
Filed Dec. 23, 1958 3 Sheets-Sheet 1

INVENTOR.
DALE C. CLAPSADDLE
BY
Woodhams Blanchard and Flynn
ATTORNEYS

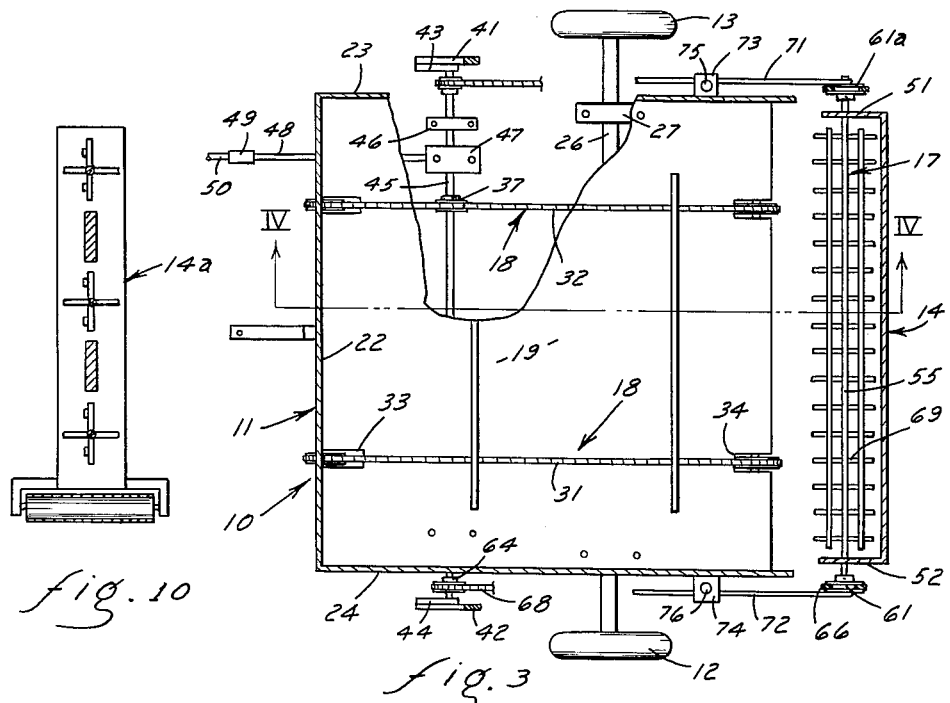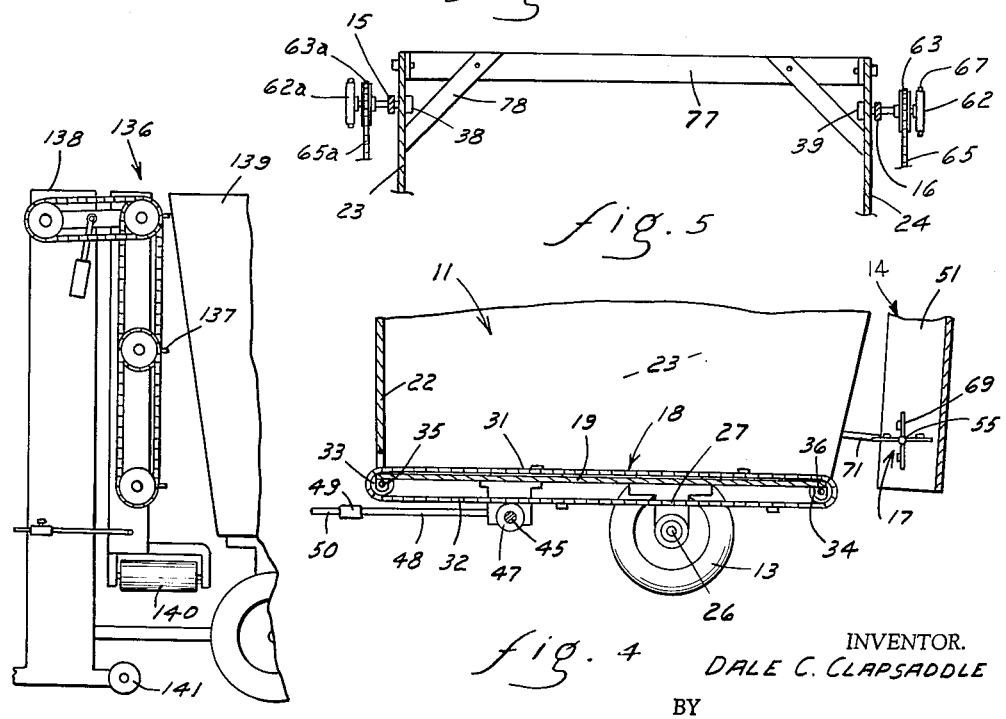

March 21, 1961 D. C. CLAPSADDLE 2,975,914
FIBROUS MATERIAL DISPENSER
Filed Dec. 23, 1958 3 Sheets-Sheet 3
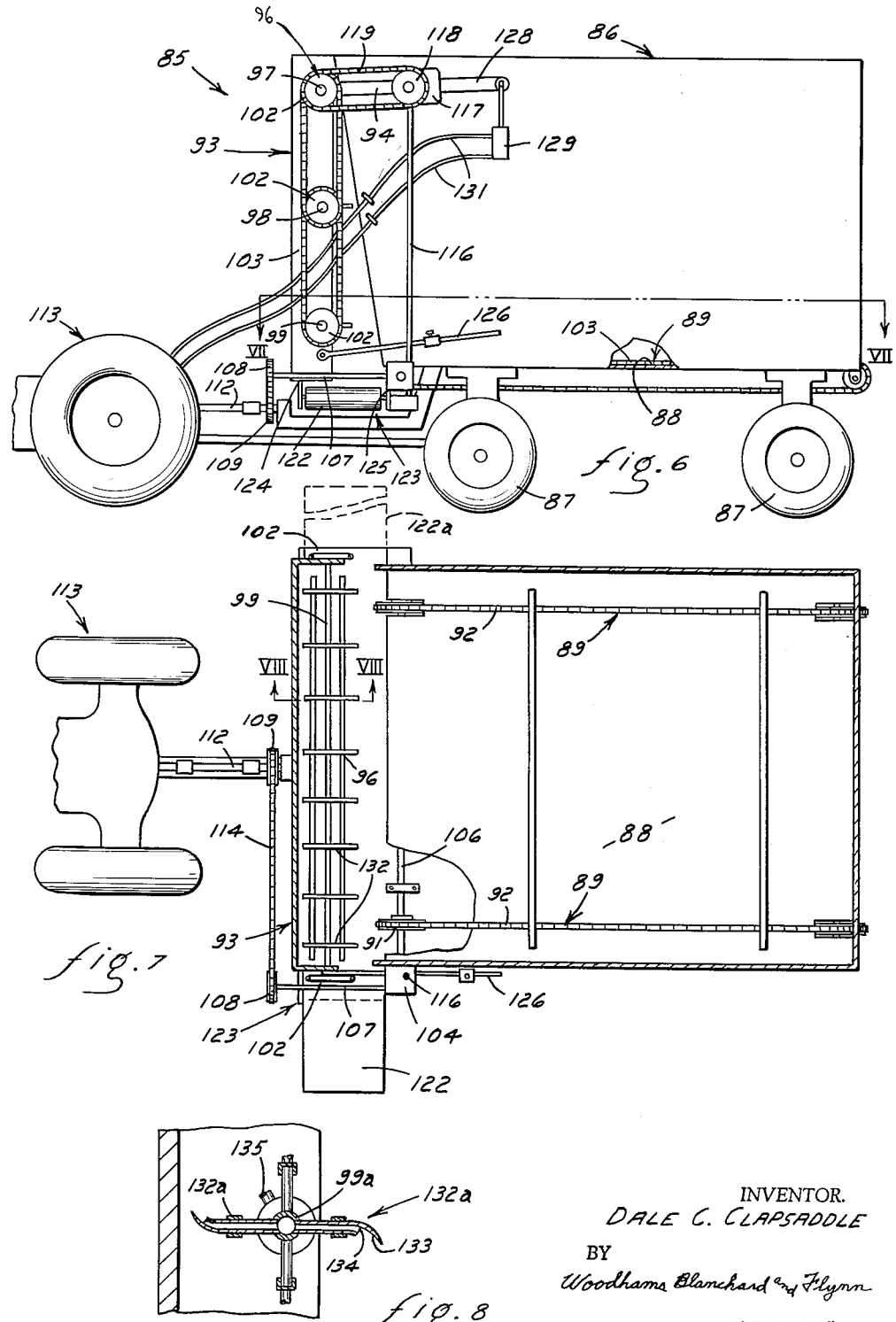
INVENTOR.
DALE C. CLAPSADDLE
BY
Woodhams Blanchard and Flynn
ATTORNEYS United States Patent Office 2,975,914
Patented Mar. 21, 1961

2,975,914

FIBROUS MATERIAL DISPENSER

Dale C. Clapsaddle, 2087 S. Oak Road, Davison, Mich.

Filed Dec. 23, 1958, Ser. No. 782,553

7 Claims. (Cl. 214—83.14)

This invention relates in general to a vehicle for transporting and unloading fibrous materials, such as forage crops, and, more particularly, to an apparatus which may be associated with a wagon and is capable of effecting a more continuous and even discharge of said materials from said wagon into a receptacle or onto a conveyor than is possible with present equipment designed for the same or similar purposes. This application is a continuation-in-part of my patent application Serial No. 551,565, filed December 7, 1955.

Vehicles, hereinafter referred to as forage wagons, which are presently in use for transporting and dispensing or unloading fibrous materials, have been found unsatisfactory for several reasons. In the first place, the discharge mechanisms tend to clog up and become inoperative if the load of materials is relatively deep within the materials compartment. Secondly, even when said load is not excessive, they do not dispense or discharge the materials as evenly as is often desired. This is due primarily to the fact that the beaters, which are supposed to break up the materials while discharging them, are not coordinated with the opening through which said materials are discharged. Furthermore, some forage crops, such as alfalfa or other stalk type materials, tend to pack and become very dense and difficult to break up when they are moist or green, particularly if they are loaded in a wagon of even average depth. Thus, due to the arrangement of the discharge mechanism in said presently used forage wagons, dead spots develop in the path of movement of the materials, resulting in erratic unloading and/or stoppages.

Accordingly, a primary object of this invention is the provision of a materials discharging apparatus for a forage wagon, which is capable of overcoming the above-mentioned problems, which can be connected to, and operated from the power of, a tractor or other power source, which is simple to operate and adjust, which is completely automatic in its operation and which can be effectively used while moving or stationary.

Other objects and purposes of this invention will become apparent to persons familiar with this type of equipment upon reading the following specification and examining the accompanying drawings, in which:

Figure 3 is a broken, sectional view taken along the line III—III of Figure 1.

Figure 4 is a sectional view taken along the line IV—IV of Figure 3.

Figure 5 is a sectional view taken along the line V—V of Figure 1.

Figure 6 is a side elevational view of an alternate construction embodying the invention.

Figure 7 is a broken, sectional view taken along the line VII—VII in Figure 6.

Figure 8 is a broken, sectional view taken along the line VIII—VIII in Figure 7.

Figure 9 is a fragment of an alternate structure.

Figure 10 is a sectional view substantially as taken along the line X—X in Figure 2 and showing an alternate discharge gate.

Figure 1:
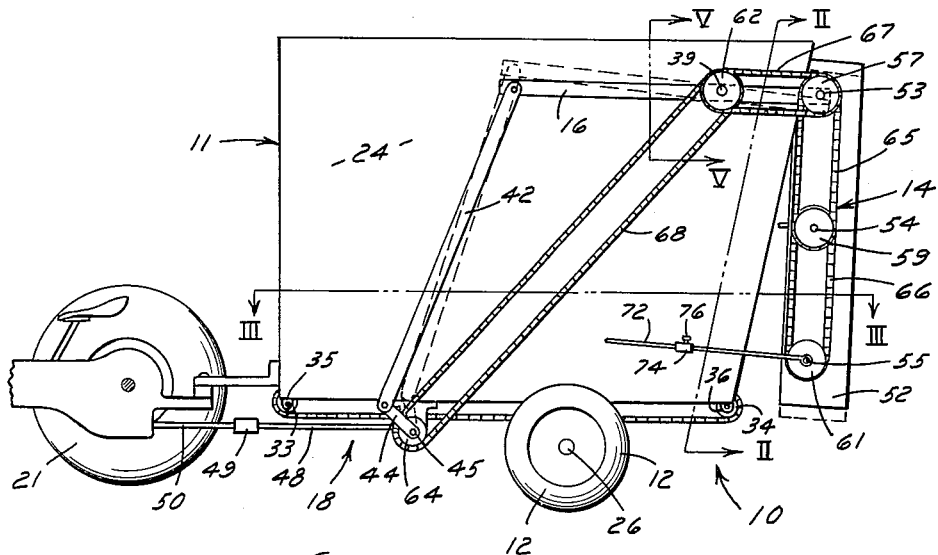
Figure 1 is a side elevational view of a vehicle incorporating my invention.

For the purposes of convenience in description, the terms "upper," "lower," and derivatives thereof, have reference herein to the invention in its normal position of operation, as appearing in Figure 1. The terms "front" and "rear" have reference to the left and right ends, respectively, of the structure appearing in Figures 1 and 6. The terms "left" and "right" have reference to the lower and upper sides, respectively, of the structure as appearing in Figures 3 and 7. The terms "inner," "outer," and derivatives thereof, have reference to the geometric center of the invention and parts thereof.

General description

In order to meet the objects and purposes set forth above, as well as others related thereto, I have provided a vehicle 10 (Figure 1) having a materials compartment 11 mounted upon a pair of ground engaging wheels 12 and 13 (Figure 3). The compartment 11 is provided with a tail gate 14 at its rearward end, which is pivotally supported near its upper edge upon the rear ends of a pair of rocker arms 15 and 16 (Figure 2) pivotally supported intermediate their ends upon the opposite sides of said compartment 11. A plurality of beaters 17 are rotatably supported upon the inner side of the tail gate 14. Drive means is provided for simultaneously rotating the beaters 17 and rocking the arms 15 and 16 to effect an even positive discharge of materials disposed within the compartment 11 adjacent to said tail gate 14. The materials are moved toward the tail gate by the conveyor elements 18 supported upon the bed 19 of the compartment 11. The vehicle 10 may be releasably secured to, and drawn by, any conventional means, such as the tractor 21, which also supplies the power for operating the beaters and moving the tail gate. The vehicle 10 may also be self-propelled and include a chopper mechanism.

Detailed construction

Figure 2:
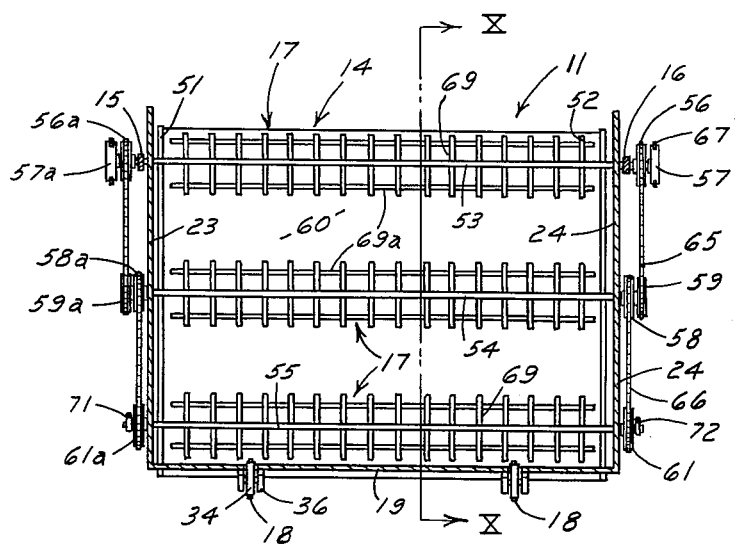
Figure 2 is a sectional view taken along the line II—II of Figure 1.

As shown in Figures 1 and 2, the materials compartment 11 of the vehicle 10 has a front end wall 22, a right side wall 23 and a left side wall 24 (Figure 3), all of which may be removably or permanently secured to the corresponding edges of a bed 19. The side walls may diverge rearwardly and downwardly, if desired, to ease the rearward movement of the load. In this particular embodiment, a single axle 26 is mounted beneath and transverse of the bed 19 by bearings 27, said wheels 12 and 13 being mounted upon the opposite ends of said axle.

The conveyor elements 18 (Figures 3 and 4) may be comprised of a pair of endless chains each having an upper course 31 and a lower course 32. Said chains 18 are supported at the ends of their courses upon the sprockets 33 and 34, which are rotatably supported by means of the bearings 35 and 36 secured to the under surface of the bed 19. The sprockets 33 and 34 extend through appropriate openings in the bed 19 so that they support the upper course 31 adjacent to the upper surface of said bed and the lower course 32 below said bed.

The rocker arms 15 and 16 (Figures 1 and 2) are pivotally supported intermediate their ends upon the co-axial, horizontal stub shafts 38 and 39, which are in turn supported upon the outer sides of the right and left side walls 23 and 24, respectively, near the upper edges thereof. The forward ends of said arms 15 and 16 are pivotally engaged by the upper ends of the link rods 41 and 42 (Figure 3), respectively, which extend downwardly along the side walls 23 and 24 to be pivotally engaged at their lower ends by the outer free ends of the cranks 43 and 44, respectively. Said cranks 43 and 44 are secured upon the opposite ends of a crankshaft 45, which is rotatably supported upon and beneath the bed 19 by the bearings 46, located forwardly of the axle 26.

The crankshaft 45 extends through a gear box 47 by means of which said crankshaft is connected to and driven by the drive shaft 48, which is connected by the universal joint 49 to the power take-off shaft 50 on the rear end of the tractor 21. Sprockets 37 are secured upon the crankshaft 45 between the bearings 46 for engaging the lower courses 32 of the chains 18 and driving them.

As shown in Figures 1 and 2, the tail gate 14 has a pair of flanges 51 and 52 extending forwardly from the lateral, substantially vertical edges thereof. Said flanges 51 and 52 are disposed between, and snugly adjacent to, the sides 23 and 24, respectively, of the compartment 11 at the rearward end thereof. A plurality, here three, of beater shafts 53, 54 and 55 extend through, and are rotatably supported upon, said flanges 51 and 52 so that they are substantially parallel with each other and with said tail gate 14 and are spaced vertically thereon. The upper beater shaft 53 is rotatably supported outwardly of flanges 51 and 52 upon, and within the rearward ends of, the rocker arms 15 and 16. Thus, the tail gate 14 is pivotally supported near its upper end upon the arms 15 and 16, so that oscillation of the rocker arms 15 and 16 about the stub shafts 38 and 39, caused by the cranks 43 and 44 acting through the link rods 41 and 42, produces an upward and downward reciprocation of the tail gate 14.

A pair of sprockets 56 and 57 (Figure 2) are mounted upon, and rotatable with, the leftward end of the upper beater shaft 53, outwardly of the rocker arm 16. A pair of sprockets 58 and 59 are supported upon, and rotatable with, the leftward end of the middle beater shaft 54 outwardly of the flange 52. A single sprocket 61 is supported upon, and rotatable with, the leftward end of the lower beater shaft 55, outwardly of said flange 52. A pair of sprockets 62 and 63 (Figure 5) are rotatably supported upon the stub shaft 39 outwardly of the arm 16. A sprocket 64 (Figure 3) is supported upon, and rotatable with, the crankshaft 45 between the crank 44 and the sidewall 24.

The inner sprocket 56 (Figure 2) on the beater shaft 53 is connected to the outer sprocket 59 on the beater shaft 54 by means of a chain 65. The inner sprocket 58 on the shaft 54 is connected to the sprocket 61 on the shaft 55 by the chain 66. The outer sprocket 57 (Figure 1) on shaft 53 is connected to the outer sprocket 62 on the stub shaft 39 by the chain 67. The inner sprocket 63 on said stub shaft 39 is connected to the sprocket 64 on the crankshaft 45 by a chain 68. Thus, by appropriate arrangement of the gears in gear box 47 (Figure 3) a counterclockwise rotation of the beater shafts 53, 54 and 55 (Figure 1) can be effected. Said beater shafts 53, 54 and 55 (Figures 2 and 3) are each provided with a plurality of radially extending beater elements 69 which, due to said counterclockwise rotation of the beater shafts, effect a downward movement of the materials adjacent thereto toward the space between the bed 19 and the lower edge of the gate 14. However, some or all of said beater shafts may be rotated in the opposite direction, if desired, by appropriate arrangement of the drive means. Also said beater shafts may be connected to their respective sprockets through slip clutches, not shown, if desired. The elements 69 are interconnected by beater bars 69a in a conventional manner.

A system of sprockets and chains similar to that above described in detail with respect to the leftward side of the vehicle 10 may be provided on the rightward side thereof, if desired or required by the particular operating conditions involved. Where such parts are disclosed herein on the rightward side of said vehicle, they are indicated by adding the suffix "a" to the numeral identifying the corresponding part on the leftward side, as described above.

Adjustment rods 71 and 72 are pivotally mounted at the rearward ends of each upon the extended ends of the lower beater shaft 55. Said rods are slidably engaged intermediate their ends by the adjustment fixtures 73 and 74, which are pivotally supported upon the outer surface of the side walls 23 and 24, respectively, near the lower ends thereof. The rods 71 and 72 may be secured with respect to the fixtures 73 and 74 by means of adjustment bolts 75 and 76. The adjustment rods 71 and 72 tend to hold the lower end of the tail gate 14 at a substantially constant distance from the end of the bed 19 while permitting said gate 14 to reciprocate substantially vertically with respect thereto.

As shown in Figure 5, a substantially horizontal cross bar 77 may be secured to and between the upper edges of the side walls 23 and 24, and provided with downwardly extending brace bars 78 for adding strength to the wagon, particularly to the sidewalls thereof, when said compartment is substantially fully loaded.

Suitable clutching means, not shown, may be provided in association with the gear box 47 for disengaging the crankshaft 45 from the drive shaft 48, in a substantially conventional manner. Furthermore, the conveyor elements 18, the beaters 17 and the rocker arms 15 and 16 may be actuated by an independent drive mechanism, other than the power take-off of the tractor 21, in a substantially conventional manner, not shown.

*Operation*

As will be apparent from the above description, rotation of the crankshaft 45 by means of the power take-off of the tractor 21 will produce a rotation of the beaters 17 and a simultaneous, vertical reciprocation of the tail gate 14, hence, the beaters 17. It will be seen that, by spacing the beaters as disclosed herein and then reciprocating the tail gate 14, the entire rear, open area of said compartment will be occupied by a beater during at least part of one stroke of said reciprocation. Thus, dead spots which occur between beaters in presently used unloading mechanisms for forage wagons, wherein the beaters are in a fixed position with respect to the vehicle 10, are eliminated by my invention. The combined reciprocation and rotation of the beaters 17 creates complete agitation and a better break-up of the materials along the entire rear end of the compartment 11, hence, a more accurate and continuous discharge of the materials from the wagon.

The opening between the lower edge of the tail gate 14 and the opposing edge of the bed 19 is easily and adjustably controlled by the adjustment rods 71 and 72 which may be hydraulically moved with respect to the adjustment fixtures 73 and 74 by the hydraulic system of the tractor 21 or a separate system in a substantially conventional manner, not shown.

The modified vehicle 85 (Figures 6 and 7) is comprised of a materials compartment 86 which may be substantially identical to the materials compartment 11 shown in Figure 1. Said vehicle 85 has four ground engaging wheels 87 which are mounted upon the lower surface of the bed 88. Conveyor elements 89, which may be substantially identical with the endless conveyor chains 18 (Figure 3), are supported upon the bed 18 by means of sprockets 91 so that their upper courses 92 move along the upper surface of the bed 88.

A discharge gate 93 (Figure 6), which may be generally similar to the tail gate 14 (Figures 1 and 3), is supported upon the front ends of a pair of rocker arms 94, which are pivotally supported upon the opposite side walls of the materials compartment 86. In this particular embodiment, the forward ends of the rocker arms 94 pivotally engage the opposite ends of the upper beater shaft 97 which is rotatably supported upon the gate 93 and is part of the beater 96. Two other beater shafts 98 and 99 are rotatably supported upon the gate 93 in much the same manner as the beater shafts 53, 54 and 55 are supported upon the tail gate 14 (Figure 2).

The rocker arms 94 are preferably pivoted upon the side walls of the materials compartment 86 coaxially with the sprocket 118 so that the beater shafts can be rotated by the sprocket 118 and the chain 119 while the rocker arms, hence the gate 93, are being reciprocated vertically. The outer ends of the beater shafts 97, 98 and 99 are secured to sprockets 102 which are interengaged by chains 103 so that all three beaters 96 are rotated simultaneously when one of them is rotated, in the same manner as set forth with respect to the structure in Figure 2. The upper end of the gate 93 may be supported upon the arms 94 by extensible means, such as hydraulic actuators, so that the gate's upper end can be moved toward and away from the wagon. In such case, the chain 119 and sprockets 97 and 118 would be replaced with an extensible shaft, gears and universal joints.

Under some circumstances, it may be desirable to oscillate the rocker arms 94 in opposite directions so that one end of each beater 96 is moving in the opposite vertical direction from the other end thereof.

A gear box 104 (Figure 7) is supported upon the left side of the materials compartment 86 near the front and lower end thereof so that it can drive a conveyor shaft 106 which supports the front sprockets 91 (Figure 7) driving the conveyor elements 89. An input shaft 107 is operatively connected at one end to the gear box 104 and extends forwardly therefrom where it supports a sprocket 108 which is connected with a sprocket 109 on the power take-off shaft 112 of the tractor 113 by means of a chain 114. Thus, the gear box 104 is driven by the tractor 113. A vertical shaft 116 is operatively connected at its lower end to the gear box 104 and is connected at its upper end to the gear box 177, which drives the sprocket 118. The sprocket 118 is connected by means of a chain at 119 to one of the sprockets 102 on the upper beater shaft 97, for example, whereby all the beaters 96 are rotated.

An endless belt conveyor 122 is rotatably supported near its opposite ends upon frame structure 123 in a substantially conventional manner, said frame structure 123 being hingedly supported at 124 and 125 (Figure 6) upon the lower edge of the gate 93 and the front edge of the bed 88. The hinge 124 between the cross conveyor 122 and the gate 93 is arranged so that the lower end of the gate can be adjusted toward and away from the bed 88 by means of an adjacent rod 126 which may be similar in construction and operation to either of the adjustment rods 71 and 72, and parts associated therewith, as described with respect to the structure shown in Figure 1. The conveyor 122 is driven by means of conventional gear and shaft linkage 127 between the belt conveyor 122 and that end of the conveyor shaft 106 remote from the gear box 104.

One of said rocker arms 94, such as the rocker arm appearing in Figure 6, has a rearward extension 128 which is engaged by the actuating rod of a power cylinder 129 mounted upon the side of the compartment 86. The power cylinder 129, which may be either single or double acting, is connected by the conduits 129 to the hydraulic system of the tractor 113. Thus, by operating the power cylinder 128, the rocker arm 94 is caused to pivot around the axis of the sprocket 118, thereby causing the gate 93 to reciprocate vertically.

The beaters 96 each have a plurality of beater elements 132, which may be substantially straight metallic elements extending radially from the shafts 97, 98 and 99 at intervals therealong. As shown in Figure 8 with respect to the beater shaft 99a, the beater shafts may be hollow and the beater elements 132a may also be hollow and in communication with the interior of the beater shaft 99a. The outer ends of the beater elements 132a are provided with cutting edges 133 which are directly aligned with the outlet openings 134 of the hollow beater elements 132a. A supply of pressure fluid is fed into the beater shaft 99a by the conduit 135 and said pressure fluid then flows through the outlet openings 134 to impinge upon the cutting edges 133 and remove loose materials therefrom. This arrangement serves not only to further agitate and thereby break up the forage being broken loose and discharged by the beater elements 132a but also keeps the cutting edges free so that they can efficiently perform the desired cutting operation. The fluid may be a liquid used to moisten the fibrous material as it is unloaded.

The operation of the modified vehicle 85, particularly with respect to the discharge gate 93 and the beaters 96 supported thereon, may be substantially identical to that set forth above with respect to the vehicle 10. However, the belt conveyor 122 has been added for the purpose of directing in a more convenient manner the materials discharged from the vehicle by the discharge gate 93. The hinged support of the belt conveyor 122 upon the gate 93 and bed 88 permits the vertical reciprocation of the gate 93 without interference from the conveyor 122 and while still accomplishing the purposes of the invention. The vehicle 85 may be a self-propelled chopper wagon wherein the chopper mechanism, not shown, is supported on the wagon in front of the gate 93. Thus, after the wagon is loaded, the gate 93 can move the chopped materials into the blower of the chopper mechanism for transfer to a storage place, such as a silo.

As indicated in broken lines at 122a in Figure 7, the belt conveyor 122 may be arranged so that it extends from the opposite side of the vehicle 85. The rear panel 60 on the gate 14 may be removed, as shown by the gate 14a in Figure 10, so that another wagon, which is not equipped with a discharge gate, can be moved up to the gate 14a and have its load discharged by reversing the direction of rotation of the beaters on the gate 14a. The panels 60 may also have a transparent portion for inspection purposes.

It follows from the above description that many, if not all, of the objects of the invention can be met by providing a discharge gate 136 (Figure 9), including beaters 137, which is supported upon an independent frame 138. Thus, the single discharge gate 136 would remain at an unloading station and many wagons 139 could be moved up to the gate, one at a time, for unloading. The gate 136 could be vertically reciprocated and the beaters 137 could be rotated in substantially the same manner as set forth above with respect to the gate 93. The wagon 139 could be connected by its tongue to the frame 138 during the unloading operation. A cross conveyor 140 may be mounted upon the lower edge of the gate 136 for operation in a manner similar to that set forth above with respect to the conveyor 122 on gate 93. Also, the gate 136, or the gates 14 and 93, can be used in combination with a drag conveyor of a conventional type. The frame 138 may be supported upon wheels 141 for movement into and out of a position in front of the wagon 139. Furthermore, the beaters 137 can be supported with respect to the frame 138 so that one end of each beater is moved relative to the other end thereof. Such movement can be effected individually or collectively by means of a single device, such as one of the rocker arms 94.

The gate 14, for example, may be in two sections which are transversely hinged along a horizontal axis about midway between the upper and lower edges of the gate. In this way, the spacing between the beaters and the wagon can be varied separately.

The beaters 17 and 96 are shown as of equal diameter and similar construction. It will be recognized that beaters of various sizes and shapes may be used.

Although a particular, preferred embodiment of my invention has been disclosed hereinabove for illustrative purposes, it will be understood that variations or modifications thereof which lie within the scope of such disclosure are fully contemplated unless specifically stated to the contrary in the appended claims.

What is claimed is:

1. A vehicle for transporting and discharging fibrous materials, comprising: a materials compartment having a bed with a pair of side walls and one end wall mounted thereon; ground-engaging wheels supporting said compartment; a pair of arms pivotally mounted upon said side walls at points remote from said end wall; an end gate including a flanged wall supported near its upper edge upon and between said arms for movement around a horizontal axis into and out of a position blocking the open end of said compartment; first actuating means associated with said arms for reciprocating said gate in a substantially vertical plane defined by said flanged wall; a plurality of horizontal beater shaft supported upon the inner side of said flanged wall for rotation about substantially parallel axes fixed with respect to said gate, said shafts being spaced substantially vertically from each other; a plurality of beater elements secured to and extending substantially radially from said beater shafts; rotary drive means associated with said compartment; second actuating means responsive to rotation of said drive means for rotating said beater shafts during the reciprocation of said gate; means including a pair of rods pivotally secured at one end of each upon opposite ends of said gate near the lower edge thereof and a pair of fixture pivotally mounted upon said side walls and engaging said rods intermediate the ends thereof for adjusting the blocking effect of said gate relative to said compartment; and conveyor elements upon said bed responsive to rotation of said drive means for moving said materials toward said gate.

2. The structure of claim 1 wherein said second actuating means includes sprockets and interconnecting chains on said beater shafts and a drive sprocket rotatably supported upon said compartment coaxial with the pivot axes of said pair of arms, said drive sprocket being connected to one of the sprockets on said beater shafts by an endless chain.

3. The structure of claim 1 wherein one of said pair of arms has an extension, and said first actuating means incudes a power cylinder supported upon said materials compartment and having an actuating rod connected to said extension, said power cylinder being connected by conduits to a source of pressure fluid.

4. The structure of claim 1 wherein a belt conveyor is hingedly supported upon and between said bed and the lower edge of said gate, said gate being adjustable transversely of said belt conveyor toward and away from said bed.

5. A vehicle for transporting and dispensing fibrous materials, comprising: a materials compartment having a bed with a pair of side wall and one end wall mounted thereon; a pair of ground-engaging wheels supporting said compartment; a pair of arms pivotally mounted between their ends upon said side walls for pivotal movement about a first horizontal axis; an end gate including a flanged wall pivotally supported near its upper edge upon and between said arms for movement about a second horizontal axis into and out of a position blocking the open end of said compartment, said first and second axes being parallel; rotary drive means associated with said compartment; first actuating means, including a crank responsive to rotation of said drive means, for oscillating said arms about said first axis, said gate being thereby reciprocated in a substantially vertical plane defined by said flanged wall; a plurality of horizontal beater shafts supported upon the inner side of said flanged wall for rotation about parallel axes fixed with respect to said gate, said beater shafts being spaced substantially vertically from each other; a plurality of beater elements secured to, and extending radially from, said beater shafts; second actuating means responsive to rotation of said drive means for continuously rotating said beater shafts during the reciprocation of said gate; means including a pair of rods pivotally secured at one end of each upon opposite ends of said gate near the lower edge thereof and a pair of fixtures pivotally mounted upon said side walls and adjustably engaging said rods intermediate the end thereof, for adjusting the blocking effect of said gate relative to said compartment; and conveyor means upon said bed responsive to rotation of said drive means for moving said materials toward said gate.

6. In an apparatus for discharging fibrous material from a wagon having a bed with a pair of side walls and one end wall mounted thereon and conveyor elements upon said bed for moving said materials toward the open end thereof; the combination comprising: a frame structure; a pair of spaced arms pivotally mounted between their ends upon said frame structure for pivotal movement around a horizontal axis; a discharge gate including a flanged wall pivotally supported near its upper edge upon and between said arms for movement around said horizontal axis toward and away from said frame, whereby said gate can be moved into and out of a position blocking the open end of a said wagon adjacent thereto; first actuating means for oscillating said arms around said axis, whereby said gate is reciprocated in a substantially vertical plane defined by said flanged wall; a plurality of horizontal beater shafts supported upon the inner side of said flanged wall for rotation about substantially parallel axes fixed with respect to said gate, said beater shafts being spaced substantially vertically from each other; a plurality of beater elements secured to and extending substantially radially from said beater shafts; rotary drive means associated with said frame structure; second actuating means responsive to rotation of said drive means for rotating said beater shafts during the reciprocation of said gate; and means including a pair of rods pivotally secured at one end of each upon opposite ends of said gate near the lower edge thereof and a pair of fixtures pivotally mounted upon said frame structure and engaging said rods intermediate the ends thereof for adjusting the position of said gate relative to said frame and said wagon.

7. In an apparatus for discharging fibrous material from a wagon having a bed with a pair of side walls and one end wall mounted thereon; the combination comprising: an upright frame structure; gate support means movably mounted upon said frame structure near the upper end thereof and projecting endwardly therefrom; a discharge gate including a flanged wall pivotally supported near its upper edge upon said gate support means for movement around a horizontal axis toward and away from said frame, whereby said gate can be moved into and out of a position substantially blocking the open end of a said wagon adjacent thereto; first actuating means connected to said gate support means for effecting upward and downward movement of the projecting ends thereof, whereby said gate may be reciprocated in a substantially vertical plane defined by said flanged wall; a plurality of spaced ,substantially horizontal beater shafts supported upon said gate along the inner side of said flanged wall for rotation about substantially parallel axes arranged substantially within a plane parallel with and spaced from said wall; a plurality of beater elements secured to and extending substantially radially from said beater shafts; rotary drive means associated with said frame structure; second actuating means responsive to rotation of said drive means and connected to said beater shafts for rotating said beater shafts during the reciprocation of said gate; and means including an elongated member connected to, and supported between, said gate near the lower edge thereof and said frame structure near the lower end thereof for controlling the position of said gate relative to said frame and said wagon, and thereby controlling the movement of said materials from said wagon between the bed thereof and said gate.

References Cited in the file of this patent

UNITED STATES PATENTS

| | | |
|---|---|---|
| 2,434,718 | Recker | Jan. 20, 1948 |
| 2,555,558 | Peterson | June 5, 1951 |
| 2,600,008 | Ludeking | June 10, 1952 |
| 2,669,368 | Kammueller | Feb. 16, 1954 |
| 2,715,972 | Grygiel | Aug. 23, 1955 |
| 2,743,832 | Kappelmann | May 1, 1956 |